INVENTORS
THOMAS A. CAROTHERS
CARL H. BURKHARD
BY
Clarence B. Desjardins
THEIR ATTORNEY Oct. 17, 1950  T. A. CAROTHERS ET AL  2,526,004
TAG FORMING AND PRINTING MECHANISM
Filed Nov. 28, 1945  10 Sheets-Sheet 5
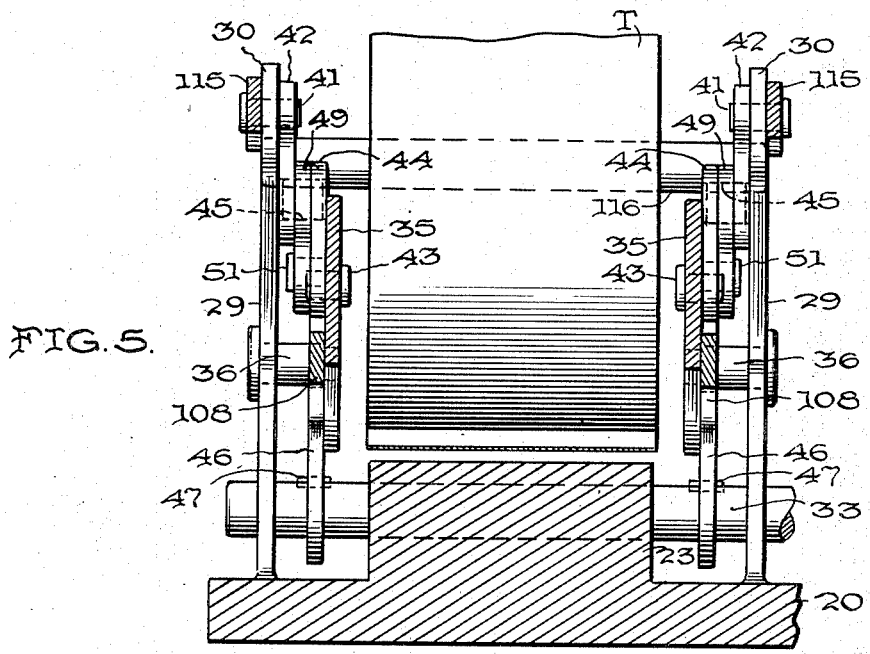
FIG. 5.
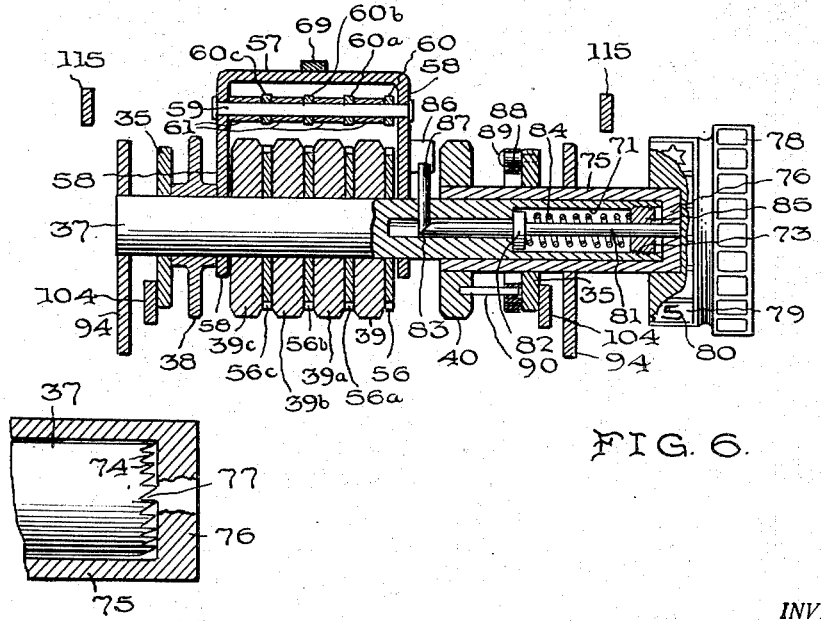
FIG. 6.
FIG. 7.
INVENTORS
THOMAS A. CAROTHERS
CARL H. BURKHARD
BY
Clarence B. Desjardins
THEIR ATTORNEY

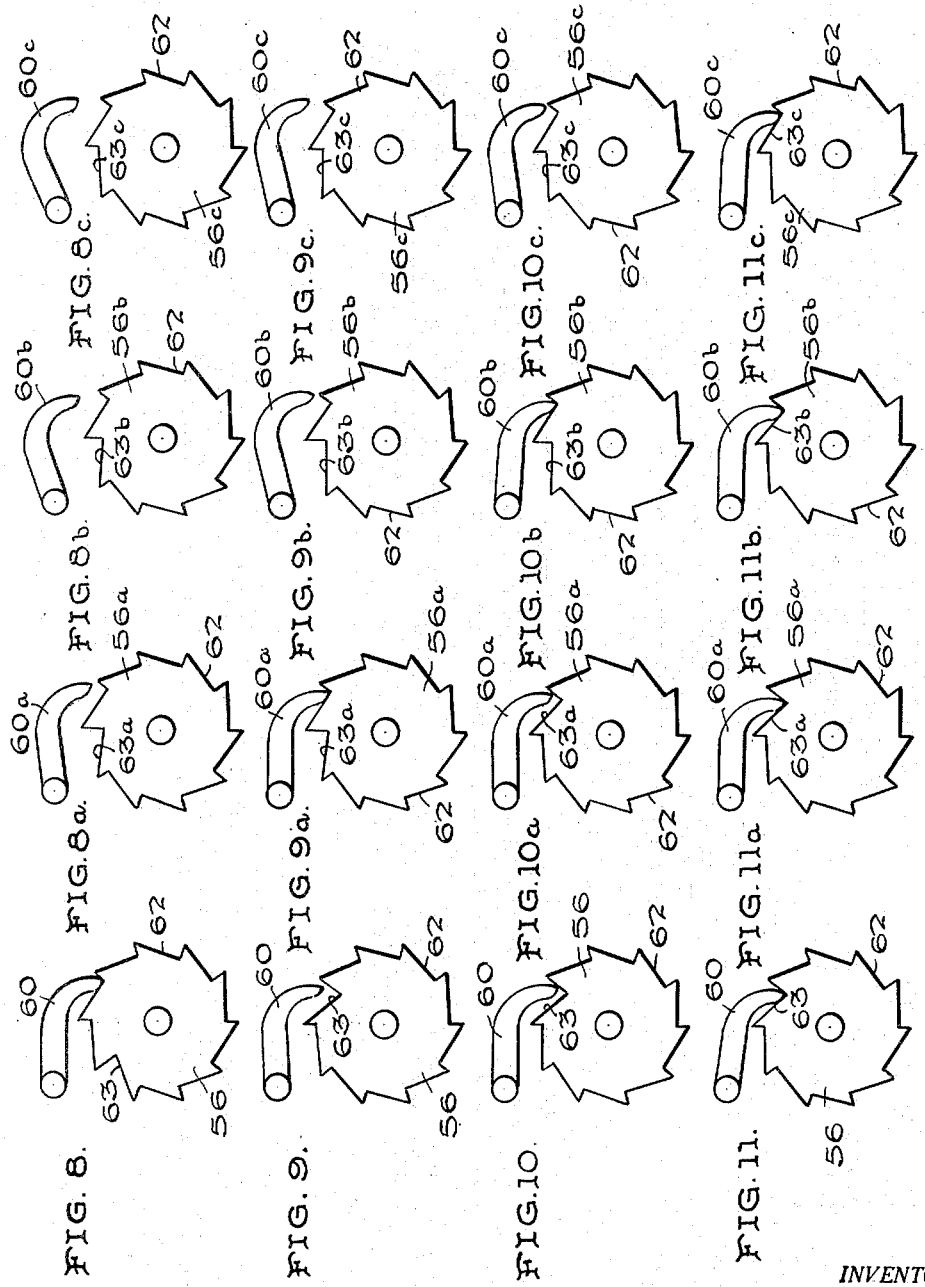

Oct. 17, 1950 T. A. CAROTHERS ET AL 2,526,004
TAG FORMING AND PRINTING MECHANISM
Filed Nov. 28, 1945 10 Sheets-Sheet 9

INVENTORS
THOMAS A. CAROTHERS
CARL H. BURKHARD
BY
Clarence B. Desjardins
THEIR ATTORNEY

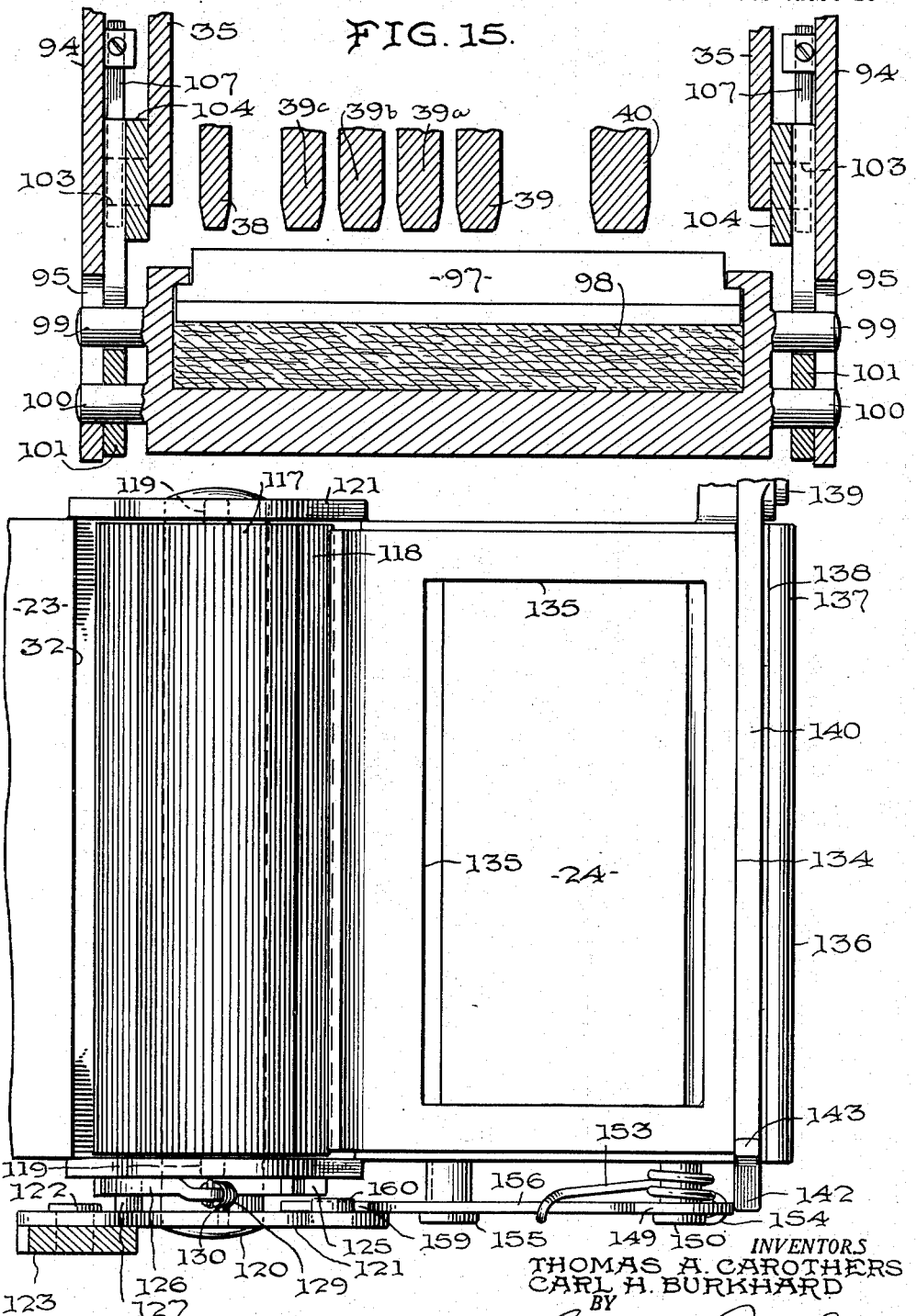

Patented Oct. 17, 1950

2,526,004

UNITED STATES PATENT OFFICE 2,526,004

TAG FORMING AND PRINTING MECHANISM

Thomas A. Carothers, Cincinnati, Ohio, and Carl H. Burkhard, Goshen, Ind., assignors to The National Marking Machine Company, Cincinnati, Ohio, a corporation of Ohio Application November 28, 1945, Serial No. 631,268

23 Claims. (Cl. 101—80)

Our invention relates to improvements in tag forming and printing mechanism and has to do, more particularly, with a machine for printing, upon the projecting end of a tape, certain characters, such as a consecutive number assigned to a lot and a number denoting the number of pieces in that lot, and for cutting off the projecting portion of tape, bearing these characters, to form a tag, one of which may be attached to each of the pieces, or garments, in the lot.

The machine forming the subject of our invention is intended, more particularly, for use in the dry-cleaning industry, in which it is the practice, to identify the garments in the cleaning process, to attach to each garment a tag on which there are printed characters indicating, for instance, the store or branch at which the lot of garments was received, the consecutive number assigned to this lot, and the number of pieces or garments contained in the lot. It is intended that each store or branch office receiving garments to be dry-cleaned shall have at least one of these machines, by which tags will be formed and printed for attachment to the individual garments before the store or branch sends them to the central dry-cleaning establishment. When a customer leaves a group of garments to be dry-cleaned, it is intended that a job or lot number shall be assigned to them, and each garment in the group should have attached to it a tag bearing the same lot number. The principal object of our invention is to provide an improved machine for feeding a portion of tape over a platen, printing on that portion of tape identifying numbers, such as a consecutive lot number and a number indicating the number of pieces in the lot, and then severing the projecting portion of tape to form a tag.

Another object of our invention is to provide relatively simple and compact mechanism, operable by a forward and return stroke of an operating lever, for moving a type-carrying head toward a platen to make an imprint upon a portion of tape resting upon the platen, for feeding said portion of tape from a supply reel, and finally, cutting off the portion of tape, on which the imprint has been made, to form a tag.

A further object of our invention is to provide a simple and improved means for moving a type-carrying head toward, and returning it from, the platen, of such nature as to accommodate a supply reel of tape in the center of the machine, thus holding the overall dimensions of the machine to a minimum.

A further object of our invention is to provide a means for moving the type-carrying head towards the platen, which has a delay action, in that the first part of the forward stroke of the operating lever is ineffective to move the type-carrying head from normal position.

Another object of our invention is to provide a device for printing a number to indicate the number of pieces in the lot, together with means for manually setting said device to print the desired number, and means for automatically restoring said device to its normal or non-printing position.

A further object of our invention is to provide a machine having a device for printing consecutive numbers, means for setting that device to print the next consecutive number, a device for printing a number to indicate the number of pieces in a lot, manual means for setting such piece number device to print the desired number, and means, automatically actuated by the setting of the consecutive number device, to automatically restore the piece number device to its normal or non-printing position.

Another object of our invention is to provide a device for printing consecutive numbers of a plurality of decimal orders and an improved means for setting this consecutive number device to print the next consecutive number.

A further object of our invention is to provide improved means for feeding tape from a supply roll, so that the tape will be fed during the return stroke, when the type-carrying head is moving away from the platen.

Another object of our invention is to provide an improved means for cutting off a portion of the tape to form a tag, which is operated by the final portion of the return stroke of the head, so that, as the type-carrying head moves to normal position after making an imprint on the tape on the platen, the tape is, first, fed forwardly of the platen and, then, the projecting portion thereof is cut off to form the tag.

A further object of our invention is to provide an improved means for inking the type of the type-carrying head, in which the inking device is moved against the type at printing position to ink the same, at the beginning of the forward stroke of the operating lever, and is then automatically moved to non-interfering position, as the type-head moves toward the platen.

Further objects, and objects relating to details of construction and economies of operation, will definitely appear from the detailed description to follow. In one instance, we have accomplished the objects of our invention by the devices and means described in the following specification, Our invention is clearly defined and pointed out in the appended claims. A structure, constituting a preferred embodiment of our invention, is illustrated in the accompanying drawings, forming a part of this specification, in which:

Fig. 5 is a vertical, sectional view, taken on the line 5—5 of Figs. 3 and 4.

Fig. 6 is a detail, sectional view, taken on the line 6—6 of Fig. 3, showing the consecutive number type-wheels and the piece number type-wheel, together with the means for setting the latter and for automatically restoring it to non-printing position.

Fig. 7 is a detail view showing the right end of the type-wheel shaft in side elevation, and the sleeve thereon in section, illustrating the inter-engaging ratchet means on shaft and sleeve.

Figs. 8, 8a, 8b, and 8c are side elevations, respectively, of the ratchet wheels and pawls for the units, tens, hundreds and thousands orders of the consecutive number device, illustrating the cooperative relations of the pawls with said ratchet wheels when no tens-tranfer is required from one order to another.

Figs. 9, 9a, 9b, and 9c are views in side elevation of the ratchet wheels and pawls for the units, tens, hundreds and thousands orders, respectively, showing the cooperation of the pawls with said ratchet wheels when a tens-transfer is to be effected from the units order to the tens order.

Figs. 10, 10a, 10b, and 10c are views in side elevation of the ratchet wheels and pawls of the units, tens, hundreds and thousands orders, respectively, of the consecutive number device, showing the cooperative relations of the pawls and ratchet wheels when a tens-transfer is to be effected from the units to the tens order, and from the tens order to the hundreds order.

Figs. 11, 11a, 11b, and 11c are views in side elevation showing the ratchet wheels and pawls for the units, tens, hundreds and thousands orders of the consecutive number device, illustrating the cooperative relations between the pawls and ratchet wheels when a tens-transfer is to be effected from units to tens order, from tens order to hundreds order, and from hundreds order to thousands order.

Figure 12:
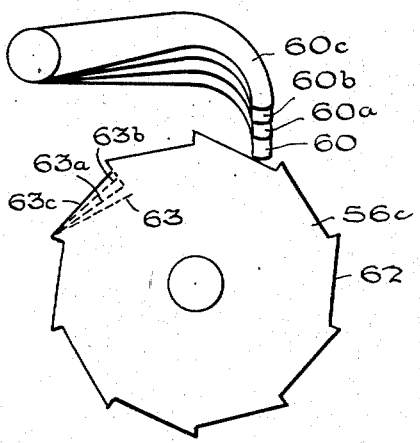

Fig. 12 is a diagrammatic view showing the relationship between the ratchet wheels and pawls for the several orders of the consecutive number device.

Figure 13:
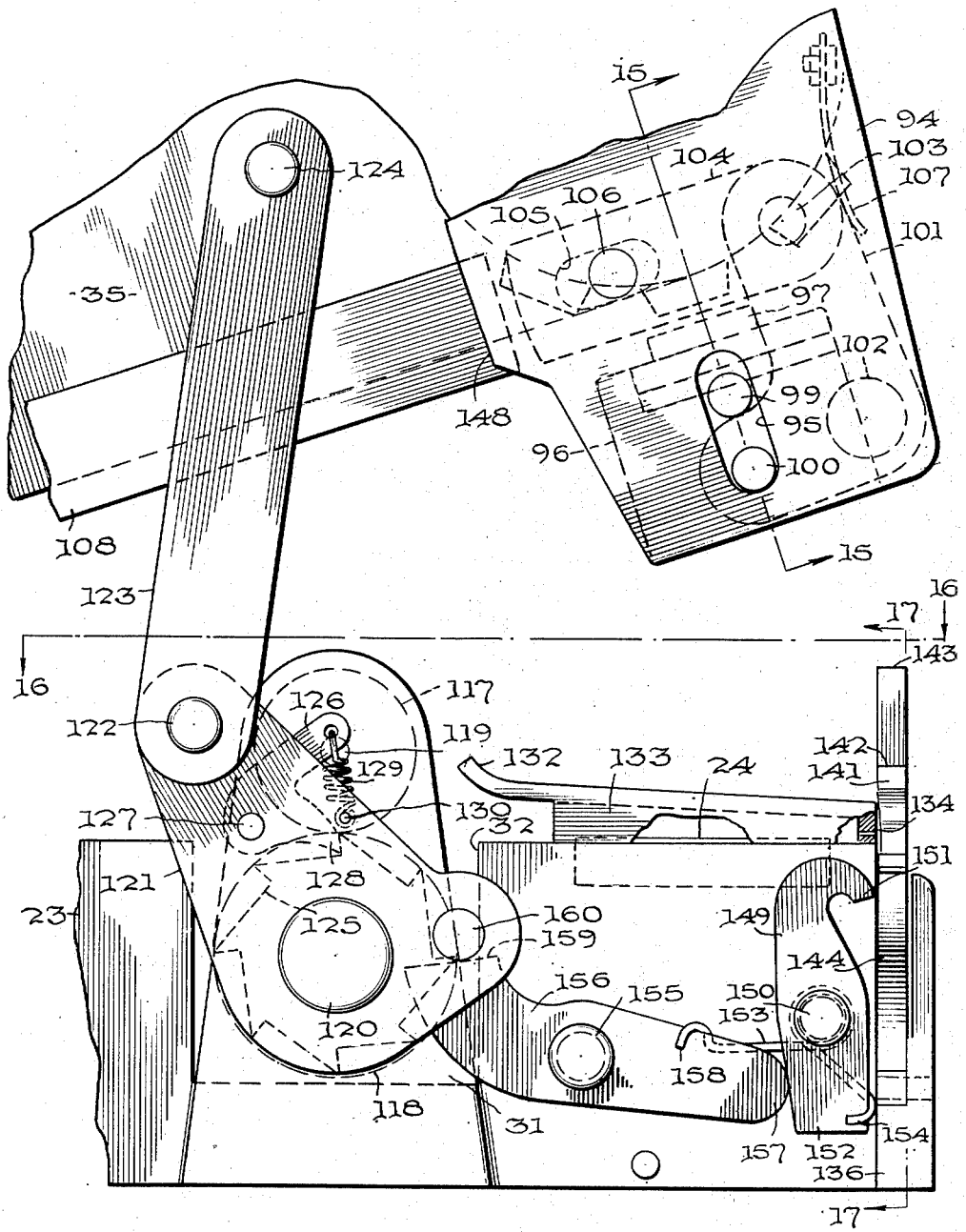

Fig. 13 is a view in left side elevation, on an enlarged scale, illustrating the tape feed mechanism, the tape cutoff mechanism, and portions of the mechanism for inking the type, the parts being shown in the normal position with the type-wheels removed from the platen.

Figure 14:
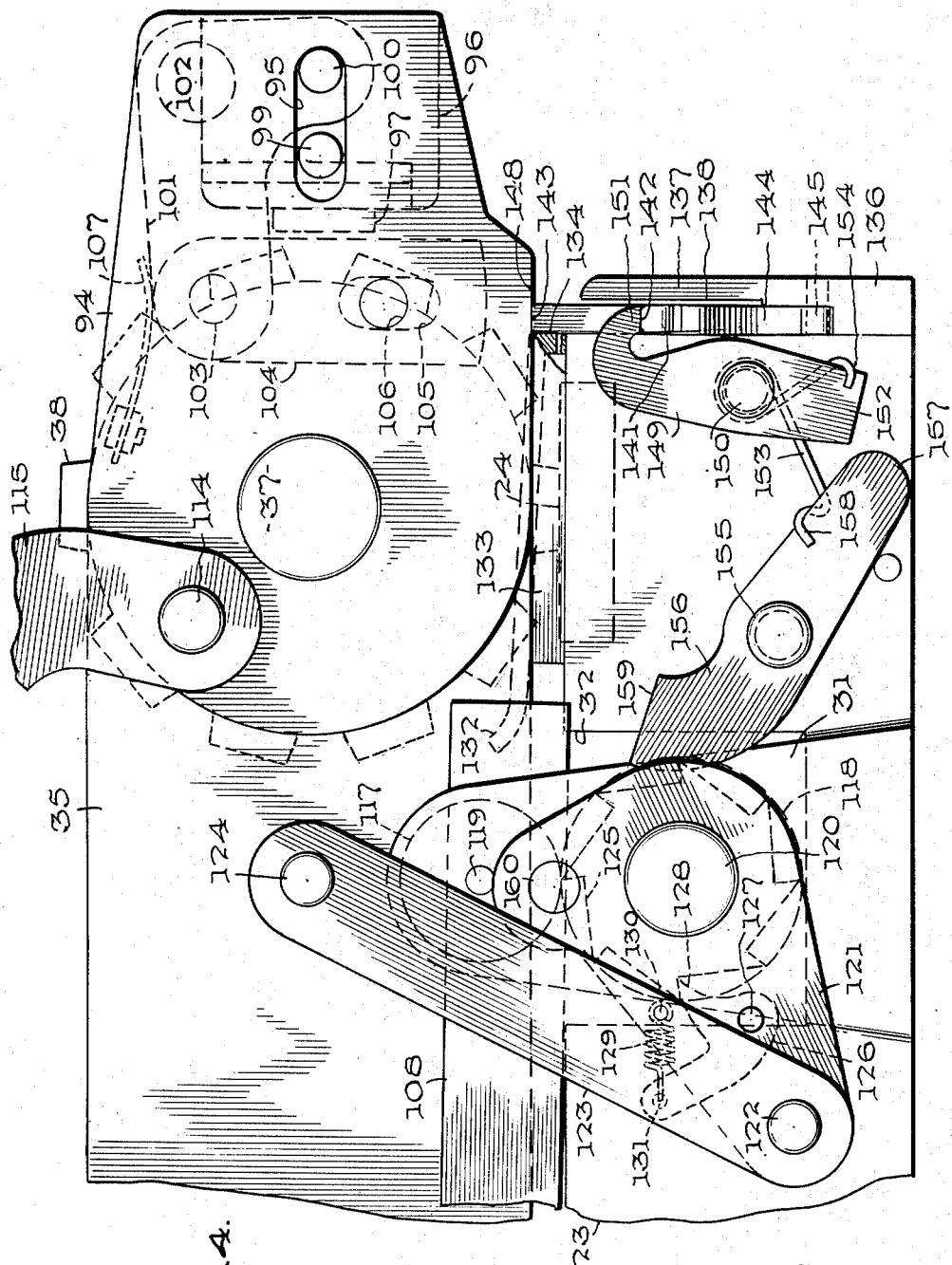

Fig. 14 is a view similar to Fig. 13, but showing the parts in the position they occupy when the type-wheels have been moved downwardly to make an imprint upon tape supported on the platen.

Fig. 15 is a detail, sectional view through the inking device, taken on the line 15—15 of Fig. 13.

Figure 17:
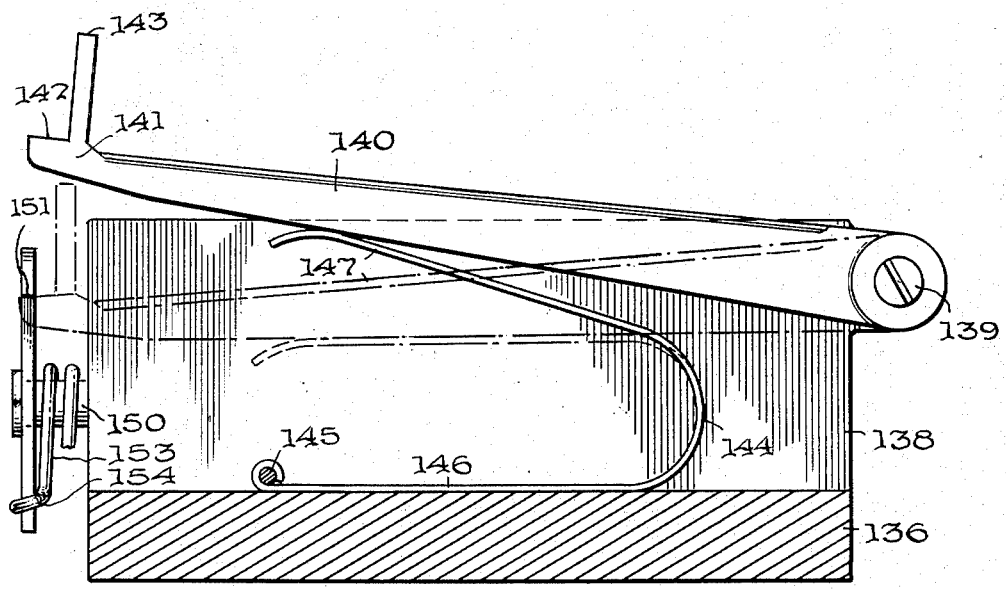

Fig. 16 is a top plan view of the tape feed mechanism, and part of the tape cutoff device, taken on the line 16—16 of Fig. 13, and Fig. 17 is a vertical, sectional view, taken on the line 17—17 of Fig. 13, illustrating the tape cutoff mechanism.

In the drawings, the same reference numerals refer to the same parts throughout the several views, and the sectional views are taken looking in the direction of the arrows at the ends of the section lines.

Referring to the numbered parts of the drawings, our machine has a frame comprising a base 20 having thereon the side walls 21 and a rear wall 22, extending upwardly a short distance from the base. The base, also, includes a central rib 23, extending forwardly from the rear wall 22 to the front end of the machine and carrying at the front end thereof a flat platen 24. A hood-shaped casing 25 is hinged to the rear end of rib 23 by the hinges 26, and the front wall of this casing has a vertically-extending slot 27, to accommodate the setting key of the consecutive number device. The right side wall of casing 25 has an upwardly extending curved slot 28, receiving the right end of the type-wheel shaft. A pair of spaced brackets 29 extend upwardly from the base 20, near the rear end thereof, and each of these brackets has a forwardly-extending upper portion 30. The frame also includes a pair of spaced brackets 31, extending upwardly from base 20 near the front end thereof, which afford means for supporting the tape feeding rolls. The rib 23 has a recess 32 formed therein to accommodate the lower tape-feeding roll. A main operating shaft 33 is journaled in the right sidewall 21, the rib 23 and the lower portions of the brackets 29, and extends to the right of the machine beyond the right sidewall 21, where an operating lever 34 is keyed thereto. By pressing down on the upper end of lever 34, the operator rocks shaft 33 counterclockwise (Fig. 3), in opposition to certain springs.

Each bracket 29 has a laterally-projecting stud 36, upon which the rear end of an arm 35 is pivoted. These two spaced arms carry a type-wheel shaft 37 at the forward end thereof, on which there are mounted a type-wheel 38, adapted to print a number or character to indicate the store or branch in which the machine is located, four consecutive number type-wheels 39, 39a, 39b, 39c, and a piece number type-wheel 40, adapted to print a number to denote the number of pieces in the lot. The type-wheel 38 will be adjusted to position to print the desired number or character and, then, fixed on the type-wheel shaft 37, since it is intended that all tags printed by a given machine shall have the same character or number printed by type-wheel 38 as a part of the mark. The arms 35, shaft 37 and type-wheels 38, 39, 39a, 39b, 39c and 40, constitute a type-carrying head, which is adapted to be rocked to bring the type at printing position into contact with tape supported on the platen 24.

The upper end of an upper toggle link 42 is pivoted on a stud 41 on the forwardly projecting portion 30 of each bracket 29. The lower end of a lower toggle link 44 is pivoted on a stud 43 carried by each arm 35. The opposite ends of links 42 and 44 are pivotally connected by a pin 45, and constitute a toggle linkage, which, when straightened out, rocks the corresponding arm 35 about stud 36. Rock arms 46 are fastened to shaft 33 by means of keys 47 and each of these rock arms has a forwardly-extending cam nose 48, for a purpose to be described hereafter. To the upper end of each rock arm 46, the rear end of a link 49 is pivotally connected by a pin 51, and the forward end of each link 49 has a slot 50 therein, which receives the pin 45 connecting the inner ends of the corresponding toggle links 42 and 44. Two springs 53 are provided, the lower end of each of which is fastened to a spring anchor 52 secured to the base 20, while the upper end of each spring is connected, as at 54, to the corresponding rock arm 46. These springs tend to rock arms 46 and shaft 33 clockwise (Fig. 3) into engagement with stops 55, carried by the standards 29 and limiting the clockwise movement of arms 46. When the operator presses down on the forward end of lever 34, and rocks shaft 33 counterclockwise (Fig. 3) against the force exerted by springs 53, links 49 are first moved forwardly until pins 45 engage the rear end of slots 50. This first portion of the counterclockwise rocking movement of shaft 33 has no effect to move arms 35, but the further counterclockwise rocking of shaft 33 will move the pins 45 forwardly, straightening out the toggle links and, thus, rocking arms 35 counterclockwise about their pivots to bring the type-wheels into engagement with tape on the platen.

The type-carrying head includes a consecutive number device having the units order type-wheel 39, the tens order type-wheel 39a, the hundreds order type-wheel 39b and the thousands order type-wheel 39c, each of these type-wheels being journaled on the type-wheel shaft 37, between the arms 35. Each of these type-wheels has ten type on the periphery thereof for printing the digits "0" and "1" to "9," inclusive. Ratchet wheels 56, 56a, 56b, and 56c are interspersed with the consecutive number type-wheels and secured to them, respectively. Each of these ratchet wheels has ten notches, corresponding to the ten printing positions of the type-wheel to which it is fixed. The yoke 57 has its legs 58 journaled on the shaft 37 and embraces the set of type-wheels and ratchet wheels. A pawl shaft 59 is journaled in the legs 58 of said yoke, above the type-wheels, and has pawls 60, 60a, 60b, and 60c secured thereto, in staggered relation, these pawls being held in proper spaced relation by the sleeves 61 on pawl shaft 59, so that the pawls are in line with the respective ratchet wheels 56, 56a, 56b and 56c. Each of these ratchet wheels, shown in Figs. 8 to 12, inclusive, has ten notches and these notches correspond with the printing positions of the type-wheel to which the ratchet wheel is secured. That is to say, when the "7" notch is in position to be engaged by its pawl, the corresponding type-wheel will have the "7" type in printing position. For each printing position except the "9" position, each ratchet wheel has a notch 62, all of which are of uniform depth. Notches 63, 63a, 63b and 63c are provided in the respective ratchet wheels at the "9" position and these notches are of varying depth, the notch 63 on the units order ratchet wheel 56, at the "9" position, being deepest, the notch 63a on the tens order ratchet wheel 56a being next in depth, the notch 63b on the hundreds order ratchet wheel 56b being next in depth, and the notch 63c on the ratchet wheel 56c of the thousands order being of the same depth as the notches 62. As shown in Fig. 12, the pawls 60, 60a, 60b and 60c are fastened on the pawl shaft 59 in staggered relation, the tip of pawl 60 being closest to the axis of the ratchet wheels, the tip of pawl 60a being next, the tip of pawl 60b being next, and the tip of pawl 60c being most remote from the axis of the ratchet wheels. The spacing of these pawls is such that, when pawl 60 engages the bottom of one of the notches 62 of ratchet wheel 56, inasmuch as the pawls are all secured to the pawl shaft, the remaining pawls 60a, 60b and 60c will be held out of engagement with their ratchet wheels, but, when the ratchet wheel 56 is at the "9" position, so that pawl 60 drops into the deep notch 63, the other pawls are permitted to move toward the axis of the ratchet wheels so that one or more of them engage therewith.

The diagrammatic views, Figs. 8 to 11c, inclusive, illustrate the cooperation of the pawls and ratchet wheels for the several decimal orders, under varying conditions. Figs. 8 to 8c, inclusive, show these parts in the positions they assume when there is to be no tens-transfer from one order to another. Pawl 60 engages the notch 62 in ratchet wheel 56 of the units order, at the "7" position, and pawls 60a, 60b and 60c are thereby held away from the ratchet wheels 56a, 56b and 56c of higher order. Consequently, when yoke 57 is rocked counterclockwise (Fig. 3), ratchet wheel 56, and the type-wheel 39 secured thereto, will be advanced one step from the "7" to the "8" position, and the ratchet wheels and type-wheels of higher orders will not be disturbed. Figs. 9 to 9c, inclusive, show these ratchet wheels and pawls in the positions they assume when there is to be a transfer from the units to the tens order, but to no higher order. It will be noted that the units ratchet wheel 56 is at the "9" position, so that pawl 60 can drop into the deep notch 63. This permits pawl 60a to drop to the bottom of the notch 62 at the "8" position of the tens order ratchet wheel 56a, and the engagement of pawl 60a with the bottom of that notch holds pawls 60b and 60c away from the ratchet wheels 56b and 56c of the hundreds and thousands orders. Accordingly, when the yoke 57 is rocked counterclockwise (Fig. 3), the units order ratchet wheel 56, and the type-wheel 39 secured thereto, will be advanced one step from the "9" position to the "0" position, the tens order ratchet wheel 56a and the type-wheel 39a attached thereto, will also be advanced one step by pawl 60a, that is, from the "8" position to the "9" position, and the ratchet wheels 56b and 56c, and type-wheels 39b and 39c, of the hundreds and thousands orders will not be affected. Figs. 10 to 10c, inclusive, show the relations of the parts when there is to be a tens-transfer from the units to the tens order, and from the tens to the hundreds order. Ratchet wheel 56 for the units order is at the "9" position, so that its deep notch 63 is engaged by pawl 60 of the units order. The ratchet wheel 56a and type-wheel 39a for the tens order are, likewise, at the "9" position, so that the pawl 60a seats in the deep notch 63a. This permits the pawls to rock until pawl 60b of the hundreds order engages the bottom of notch 62 at the "8" position, which prevents further rocking of the pawls and holds the pawl 60c for the thousands order away from the ratchet wheel 56c for that order. Accordingly, when the yoke 57 is rocked counterclockwise (Fig. 3), ratchet wheel 56 and type-wheel 39 for the units order will be advanced one step from the "9" to the "0" position, ratchet wheel 56a and type-wheel 39a of the tens order will be advanced one step from the "9" position to the "0" position, and ratchet wheel 56b and type-wheel 39b for the hundreds order will be advanced one step from the "8" to the "9" position, Ratchet wheel 56c and type-wheel 39c for the thousands order will not be affected, since the pawl 60c is held out of engagement. Figs. 11 to 11c, inclusive, show the positions of the parts under the condition that there is to be a tens-transfer from the units to the tens order, from the tens to the hundreds order, and from the hundreds to the thousands order. Ratchet wheel 56 and type-wheel 39 of the units order are at the "9" position, so that pawl 60 is permitted to drop to the bottom of the deep notch 63. Ratchet wheel 56a and type-wheel 39a for the tens order are at the "9" position, so that pawl 60a is permitted to drop to the bottom of the deep notch 63a, and ratchet wheel 56b and type-wheel 39b for the hundreds order are at the "9" position, so that pawl 60b is permitted to drop to the bottom of the deep notch 63b, and this permits pawl 60c of the thousands order to engage the notch 62 in ratchet wheel 56c, at the "8" position. Consequently, when yoke 57 is rocked counterclockwise (Fig. 3), the units order ratchet wheel 56 and type-wheel 39 are advanced one step from the "9" to the "0" position, ratchet wheel 56a and type-wheel 39a of the tens order are advanced one step from the "9" to the "0" position, ratchet wheel 56b and type-wheel 39b of the hundreds order are advanced one step from the "9" to the "0" position, and ratchet wheel 56c and type-wheel 39c of the thousands order are advanced one step from the "8" to the "9" position.

Figure 1:
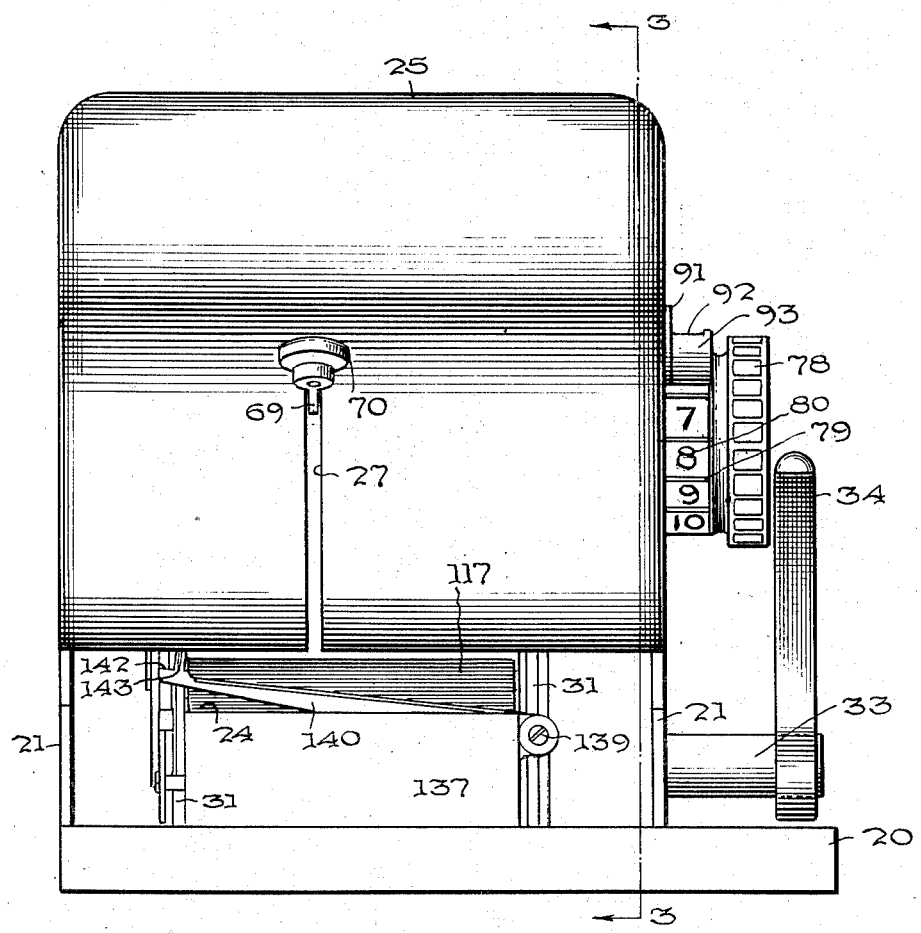
Fig. 1 is a view in front elevation of a machine embodying our invention.
Figure 2:
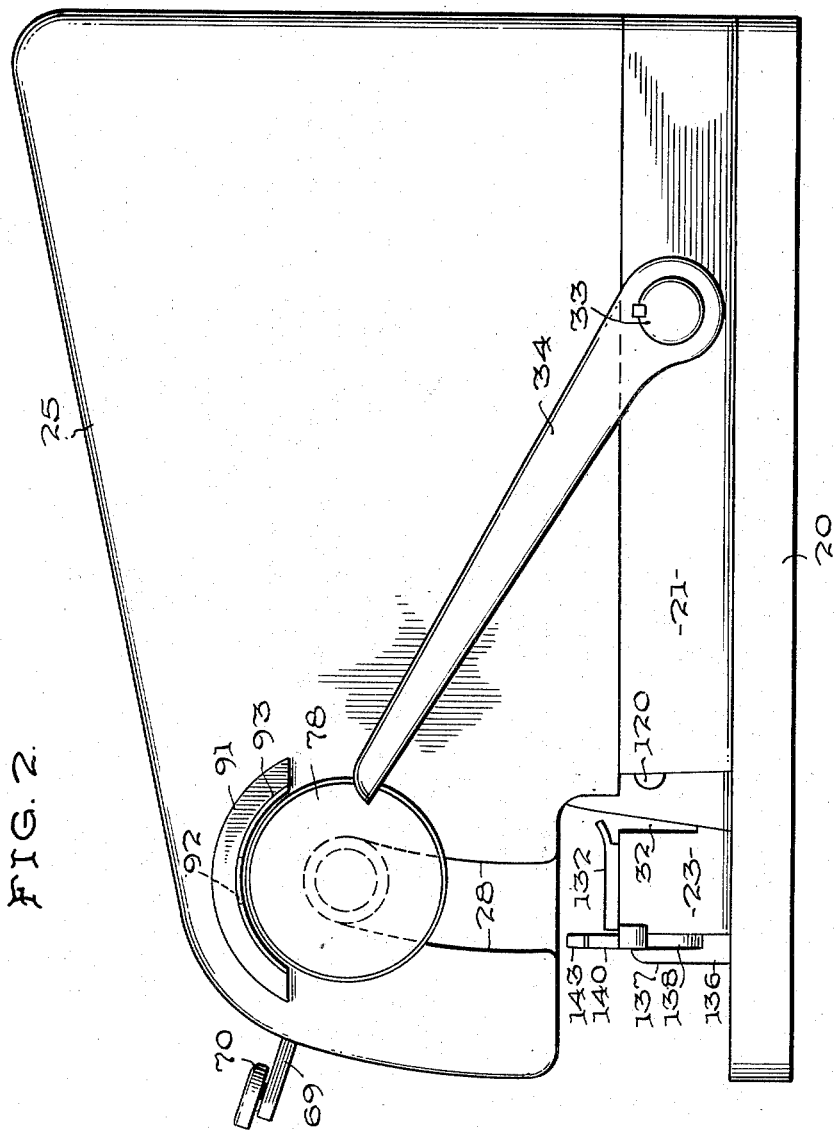
Fig. 2 is a view of the machine in right side elevation.
Figure 3:
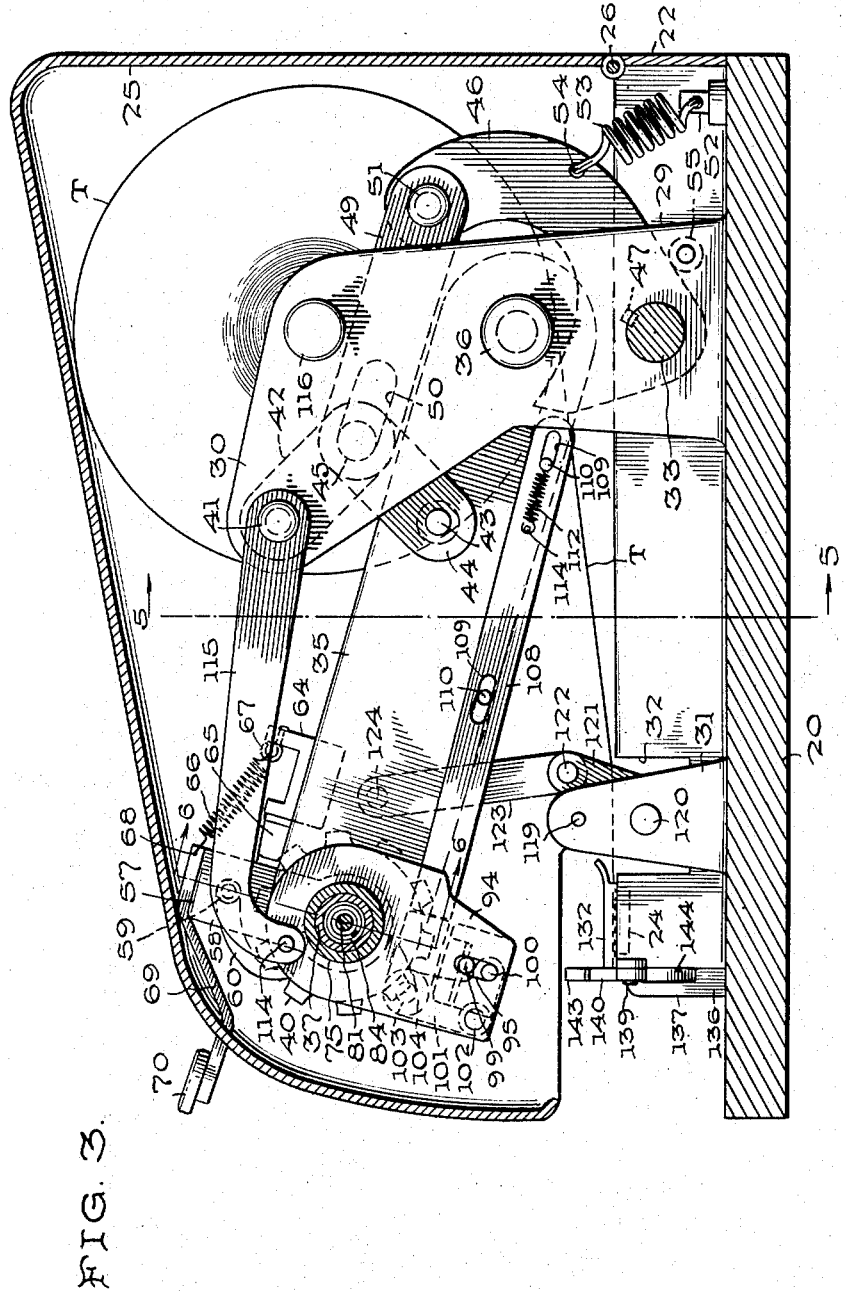
Fig. 3 is a vertical, sectional view through the machine, taken on the line 3—3 of Fig. 1.
Figure 4:
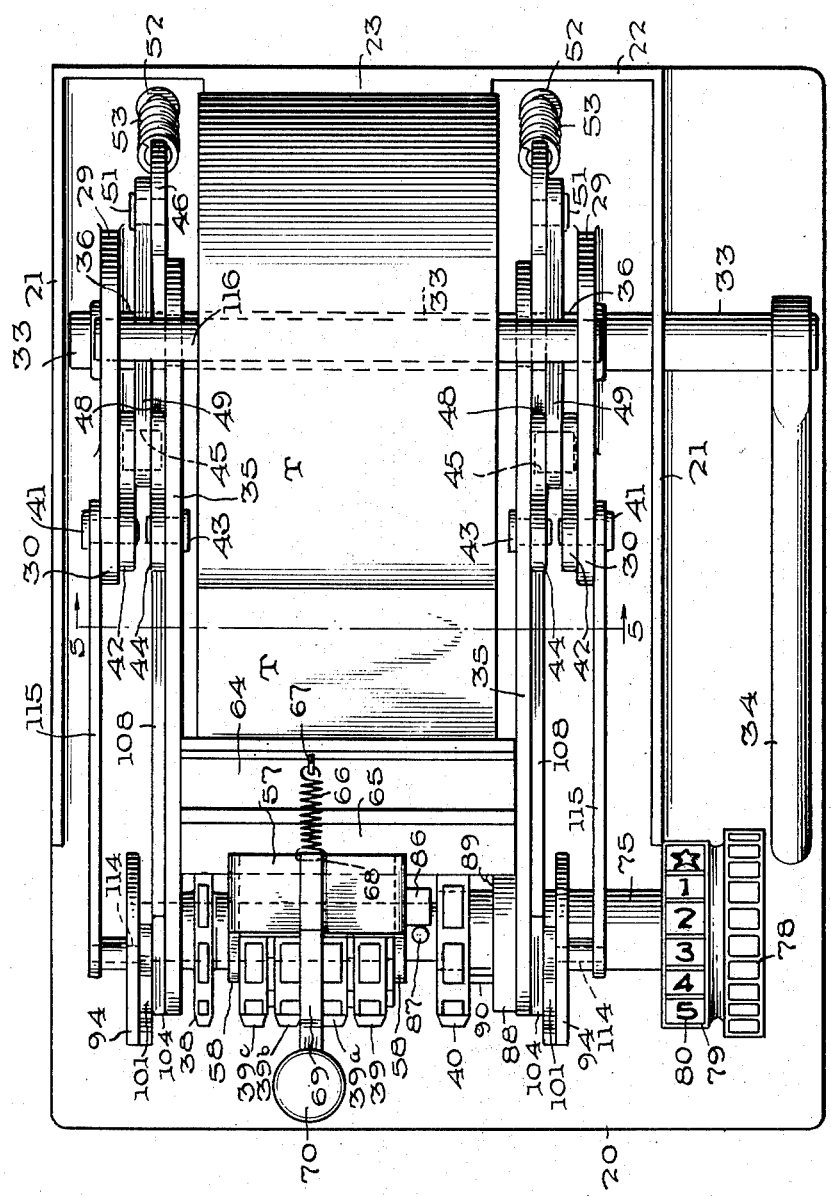
Fig. 4 is a top plan view of the machine, with the casing removed.

A cross bar 64 is supported on the forward ends of arms 35 and secured thereto, extending across the upper edges of said arms. A stop member 65 is secured to said crossbar, in front thereof, and adapted to be engaged by the rear edges of the legs 58 of yoke 57, to limit the clockwise motion of said yoke (Fig. 3). A spring 66 is connected at 67 to the crossbar 64, and the forward end of the spring is connected at 68 to the yoke 57, so that said spring tends to rock the yoke clockwise into engagement with the limiting stop 65. A setting key 69 is secured to the top of yoke 57 and extends forwardly and downwardly therefrom, through the slot 27 in the front wall of casing 25, and a key tip 70 is secured to the forward end of said key. When the operator presses down on key tip 70, yoke 57 will be rocked counterclockwise (Fig. 3) against the tension of spring 66, to set the consecutive number type-wheels to print the next consecutive number, and any tens-transfers required will be automatically taken care of because of the arrangement of notches in the ratchet wheels 36, 36a, 36b and 36c, and the staggered relation of the pawls 60, 60a, 60b and 60c, referred to above.

The type-carrying head also includes a piece number type-wheel 40, together with means for setting said type-wheel to print a desired number and automatic means for restoring said type-wheel to its normal or non-printing position. The type-wheel 40 has a plurality of type on the periphery thereof, adapted to print the numbers "1" to "15," inclusive, but has a blank space on its periphery, which is in printing position when the type-wheel occupies its normal position, referred to as the non-printing position. A chamber 71 is formed in the right end of type-wheel shaft 37 and an axial passage 72 extends to the left from the base of chamber 71. The wall of chamber 71, adjacent its open end, is internally threaded at 73, and the outer end of shaft 37, surrounding the open end of said chamber, is formed with a ring of ratchet teeth 74. A sleeve 75 is slidably and rotatably mounted on the right end of shaft 37 and one end of said sleeve is closed by a head 76. The type-wheel 40 is non-rotatably secured to sleeve 75 by means of a key (not shown), and this sleeve is slidably and rotatably mounted in the right arm 35. A ratchet tooth 77 is formed in the head 76, in position to engage the ratchet teeth 74 on the end of the shaft. A knob 78 is fastened to the right end of sleeve 75 and provided with a rim 79, on which there appear numbers 80, corresponding to the type on type-wheel 40. A plunger 81, having an enlarged shoulder 82, is slidably mounted in the chamber 71 and the portion of said plunger extending to the left of the shoulder 82, in the axial passage 72, has a pointed end 83. A spring 84 is housed within chamber 71 and interposed between the shoulder 82 of the plunger and a plug 85, which is screwed into the internally-threaded portion 73 of chamber 71. Plunger 81 extends through plug 85 and is fastened to the head 76 of sleeve 75, and the spring 84, acting on plunger 81, tends to move sleeve 75 to the left to hold the ratchet teeth 74 and 77 in engagement. A cam 86 is fastened on the right leg 58 of yoke 57, and engages a pin 87, which extends transversely of the axis of type-wheel shaft 37 and is slidably mounted in said shaft, the lower end of said pin being beveled for cooperation with the pointed end 83 of plunger 81. Cam 86 is so shaped that, when yoke 57 is rocked counterclockwise (Fig. 3) to set the consecutive number device to print the next consecutive number, pin 87 will be forced inwardly of shaft 37, thus forcing plunger 81 longitudinally against the pressure of spring 84, to disengage ratchet tooth 77 on sleeve 75 from the ratchet teeth 74 on the end of shaft 37.

A coiled spring 88, of the clock spring type, surrounds sleeve 75, one end of said spring being fastened at 89 to the adjacent arm 35, while the other end of said spring is fastened by pin 90 to the type-wheel 40. When the type-wheel is moved from normal position, this spring 88 is tensioned and returns the type-wheel 40 to its normal, non-printing position, when the ratchet teeth 77 and 74 are disengaged to permit such return movement. A stop may be provided to be engaged by type-wheel 40 when in normal position, to prevent overthrow of said type-wheel by spring 88. An indicator plate 91 is fastened to the sidewall of casing 25 and has a semi-cylindrical flange 93, which overlies the rim 79 of knob 78. This flange has a sight opening 92 therein, through which one of the numbers 80 on rim 79 will be visible to the operator. These numbers are so arranged on the rim 79 that, when a number is visible to the operator through the sight opening 92, the type-wheel 40 will be in position to print said number.

With the type-wheel 40 in its normal, non-printing position, the operator adjusts it to print the desired number by rotating knob 78 manually until said number appears in the sight opening 92. Spring 84 will yield to permit tooth 77 to ratchet over teeth 74 in such adjusting movement, or the knob 78 and sleeve 75 may be moved longitudinally to the right to clear said teeth, and then turned until the desired number appears in the sight opening 92, after which the knob will be released and spring 84 will return the parts to the position in which the ratchet teeth engage to hold the type-wheel in set position. The machine may be operated repeatedly with the type-wheel 40 so set, and it will print, on each of the tags so formed, the number to which it had been set. However, as soon as the operator depresses the setting key 70, to set the consecutive number device to print the next consecutive number, cam 86 will engage and depress pin 87, which will shift plunger 81 and sleeve 75 to the right, to remove tooth 77 from engagement with ratchet teeth 74, and, when this takes place, spring 88 will be effective to turn type-wheel 40 automatically to its normal, non-printing position. A suitable character will be disclosed through the sight opening 92, to indicate to the operator that the piece number type-wheel 40 is in the non-printing position, and to tell him that he must adjust type-wheel 40 by knob 78 to position to print the number of pieces in the new lot of garments, for which he desires to print tags.

The mechanism for applying ink to the type, of type-wheels 38, 39, 39a, 39b, 39c and 40, that are at printing position, comprises an inking frame made up of a pair of plates 94, mounted to rock about the axis of the type-wheel shaft 37. Plate 94, at the left of the machine as viewed from the front, is journaled directly on shaft 37, whereas plate 94, at the right of the machine, is journaled on sleeve 75. These plates of the inking frame are located on the outside of arms 35. Each of the plates 94 has a depending portion, in which there is provided a slot 95, extending radially with respect to the axis of shaft 37, and ink reservoir 96 is mounted between the plates 94 and carries an inking pad 97, interposed between reservoir 96 and the type-wheels and connected with a supply of ink in the reservoir by a suitable wick 98. Projecting laterally from each end of the reservoir 96 are two studs, 99 and 100, which are received in the slots 95 of plates 94 of the inking frame, so that the reservoir and inking pad are mounted in said frame to move to and from the type-wheels, radially with respect to the axis of shaft 37. Upon each plate 94, a bellcrank 101 is pivoted by means of a stud 102, and one arm of said bellcrank receives the stud 100 on the corresponding end of the reservoir, said stud passing through a hole in said arm. The other arm of each bellcrank 101 is pivotally connected by pin 103 to a pusher member 104, which is slidably mounted on the corresponding plate 94. Said pusher member has a slot 105, which receives a stud 106 carried by the adjacent plate 94. One end of a leaf spring 107 fastened to each plate 94 bears against the associated bell crank 101 so that said springs 107 tend to move the pusher members 104 rearwardly on plates 94 and to rock the bellcranks 101, in a direction to carry the inking pad 97 and reservoir 96 away from the type.

When the type-carrying head is in normal position, as shown in Fig. 13, the rear ends of the pusher members 104 are disposed adjacent the forward ends of pusher links 108, which are slidably mounted on the arms 35 that carry the type-wheel shaft 37. Each pusher link 108 has a pair of slots 109 therein (Fig. 3), which receive studs 110 mounted on the adjacent arm 35, thus providing for the slidable mounting of the pusher links 108. Each pusher link is drawn rearwardly by a spring 112, one end of which is connected to the rearmost stud 110, while the forward end thereof is connected to a pin 111 on the corresponding pusher link 108. These springs tend to hold the pusher links 108 away from the rear ends of the pusher members 104 but, when the main operating shaft 33 is rocked in the forward stroke, the cam portions 48 wipe over the rounded rear ends 113 of the pusher links 108, and thereby force said links forwardly against the tension of springs 112. This forward movement causes the front ends of links 108 to engage the rear ends of pusher members 104, so as to move said members forwardly against the tension of springs 107, thus rocking the bell cranks 101 and forcing the ink reservoir 96 and inking pad 97 toward the type to apply ink thereto. This action takes place during the first part of the forward stroke and, by the time arms 46 have rocked counterclockwise (Fig. 3) sufficiently to bring the rear ends of slots 50 against pins 45, the cam noses 48 will have passed the rear ends of pusher links 108 and said links will have been restored by the springs 112, so that springs 107 will move the inking pad away from the type. This takes place before there is any rocking movement imparted to the arms 35.

Upon each of the studs 41, carried by the forwardly-projecting portions 30 of the standards 29, there is pivotally mounted the rear end of a link 115, the forward end of which is curved downwardly and pivotally connected by pin 114 to the corresponding plate 94 of the inking frame. It will be seen that the ink reservoir 96 and inking pad 97 are normally disposed between the typewheels and the platen 24. When the arms 35 are rocked to carry the type-wheels toward platen 24, these link connections 115 will cause the plates 94 of the inking frame to rock clockwise (Fig. 3) around the axis of the type-wheel shaft 37, whereby the ink reservoir and inking pad are moved from the position shown in Fig. 13 to that shown in Fig. 14, in which they do not interfere with printing. It will be seen, therefore, that, in the first part of the forward stroke, the inking pad is moved toward the type to ink the same and then moved away from the type, and during the remaining portion of the forward stroke the inking frame, carrying the ink reservoir and inking pad, is rocked to one side to a non-interfering position.

A reel of tape, T, is carried by a spindle 116 supported by the standards 29, said reel of tape being located between the spaced arms 35 of the type-carrying head. The tape passes forwardly from the reel above the upper surface of rib 23 and between the upper corrugated roll 117 and the lower corrugated roll 118, the latter working in the recess 32 provided in rib 23. Roll 117 has trunnions 119 journaled in the standards 31, and the lower roll 118 has trunnions 120 also journaled in the standards 31. A ratchet wheel 125 is fixed to the left end of roll 118, outside of standard 31, this ratchet wheel being fixed to the trunnion 120. A pawl-carrying arm 121 is journaled on the projecting end of trunnion 120 and said arm is connected by the pivot pin 122 to the lower end of a link 123, the upper end of which is pivotally connected by pin 124 to the left arm 35 of the type-carrying head. The pawl 126 is pivotally mounted on arm 121, by means of the pivot pin 127, and the tooth 128 of said pawl is adapted to engage and cooperate with the teeth of the ratchet wheel 125, the stroke of the pawl-carrying arm 121 and the size and number of teeth of the ratchet wheel 125 being such as to give the amount of tape feed desired. A spring 129, connected at one end to a pin 130 on arm 121, and at the other end to a pin 131 on the tail of pawl 126, yieldingly holds the tooth 128 of the pawl in engagement with the teeth of the ratchet wheel 125. As the arms 35 of the type-carrying head rock to carry this head from the position shown in Fig. 13 to that shown in Fig. 14, the pawl-carrying arm 121 will rock counterclockwise and the tooth 128 of pawl 126 will ride over one or more teeth of the ratchet wheel 125 into engagement with a new tooth, as shown in Fig. 14. When the type-carrying head returns to normal position, on the return stroke of the machine, link 123 will move upwardly, thus rocking arm 121 clockwise and, due to the engagement of tooth 128 with a tooth of ratchet wheel 125, that wheel and the lower corrugated roll 118 will be rotated clockwise to feed the tape T forwardly past platen 24.

The tape T passes forwardly from the rolls 117 and 118, over the platen 24 and under the guide plate 132, which is supported from the top of rib 23 by means of the flanges 133, at each end of the platen. The forward edge of guide plate 132 is a cutting edge 134, which cooperates with a pivoted blade to shear the projecting end of the tape. Guide plate 132 has an opening 135 therein, of such dimensions as to permit the passage of type-wheels 38, 39, 39a, 39b, 39c and 40 to make an imprint upon the tape supported on platen 24. A bracket 136 is fastened to the front end of rib 23 and has a flange 137, extending upwardly and spaced from the front end of said rib, so as to form a recess 138. A blade 140 (Fig. 17) having its upper edge formed as a cutting edge for cooperation with the stationary cutting edge 134 of the guide plate, is pivoted on the pin 139, adjacent one end of the platen. The end of blade 140 remote from the pivot 139 has an operating lug 141 thereon, extending beyond the end of the platen and having a lower surface 142, for cooperation with the latch, and an upper surface 143, to be engaged by the inking frame when the type-head moves downwardly on the forward stroke of the machine. A U-shaped spring 144 is housed within the recess 138, having one end anchored by the pin 145 and the lower portion 146 of the loop resting on the base of recess 138, while the upper end 147 of the loop engages beneath blade 140 and tends to rock that blade clockwise (Fig. 17). The plate 94, at the left side of the machine, has a portion 148 (Fig. 14) and, as the type-carrying head descends and the inking frame is rocked about the axis of type-wheel shaft 37, the surface 148 will be presented in position to engage surface 143 on the operating lug 141 of blade 140, and, as the head descends, will press the blade downwardly against the pressure of spring 144, until the surface 142 of lug 141 is in position to be engaged by a latch 149. This latch is pivoted on the pin 150, projecting from the side of the forward end of rib 23, and has a hook-shaped engaging portion 151, at its upper end, adapted to engage over the surface 142 of the operating lug 141 on the blade. This latch has a tail portion 152, and a spring 153 wrapped around the pin 150 has one end, 154, hooked around the forward edge of the tail 152 of the latch 149. A releasing member 156 is pivoted on the stud 155, projecting laterally from the base rib 23, and one end of spring 153 is hooked over the forward edge of said releasing member 156, and tends to rock said member clockwise on its pivot 155. The rear end of member 156 has a shoulder 159, adapted to be engaged by a stud 160 on the pawl-carrying arm 121. When the type-carrying head and arm 121 are in normal position, stud 160 engages shoulder 159 and holds member 156 counterclockwise, against the pressure of spring 153, so that the tail 157 of that member engages the tail 152 of latch 149 and holds that latch counterclockwise in the release position, shown in Fig. 13.

This permits the blade 140 to be moved upwardly by spring 144 to a position above the top surface of platen 24, as shown in Fig. 17. When the type-carrying head moves downwardly from the position shown in Fig. 13 the counterclockwise movement of pawl-carrying arm 121 carries stud 160 away from shoulder 159, so that spring 153 is free to rock the tail 157 of member 156 away from the tail of latch 149, and to rock latch 149 to its holding position. As the head descends, and the inking frame rocks about the axis of type-wheel shaft 37, the surface 148, on the side plate 94 of the inking frame, engages the top surface 143 of the blade operating lug 141 and depresses the blade, against the pressure of spring 144, until, at the time the type engage the tape on the platen 24, surface 142 is in such position that the hook 151 of the latch engages over it. It is to be noted that the upper surface of the hook portion 151 is curved, so that, as the lower portion of the operating lug 141 descends, it will push the latch to one side and then allow it to snap over the shoulder 142. The blade 140 is, therefore, latched in its lowermost position, in which the cutting edge is below the level of the top surface of the platen 24, at the time that the type engage the tape supported on the platen. The blade remains in this latched position during the return stroke, while the type-carrying head is moving away from the platen and the tape is being fed forwardly past the edge 134, and between that edge and blade 140, until, at the very close of the return stroke, the pawl-carrying arm 121 reaches its normal position, when stud 160 engages shoulder 159 of the releasing member 156 and rocks it, to rock latch 149 to its releasing position. When that happens, and the blade 140 is released, spring 144 forces it upwardly rapidly, thus causing the blade to cooperate with the cutting edge 134 to shear the portion of tape, upon which the mark has been printed, and which had been fed past said cutting edge and the blade, thus forming a tag of said portion.

The operation of our improved tag forming and printing mechanism should be apparent from the foregoing detailed description, but will now be described briefly. It is to be assumed that a reel of tape T is in the machine, supported on the spindle 116, and that the tape has been fed forwardly between the corrugated rolls 117 and 118, and over the platen 24 to the cutting edge 134 of guide plate 132. The blade 140 will be in its upper position, shown in full lines in Fig. 17, and it will constitute a stop to prevent overfeeding of the tape. It is assumed that type-wheels 39, 39a, 39b and 39c of the consecutive number device have been set to print the desired consecutive number, and that the piece number type-wheel 40 is in its normal, non-printing position. This will be apparent to the operator, who, when he looks at the sight opening 92 on the right side of the machine, will see a character exposed through said sight opening that indicates that the piece number type-wheel is in the non-printing position. The operator, now, wishes to print and form a series of tags, each bearing a number or character to indicate the store or branch in which the machine is located, a consecutive number assigned to the particular job or lot, and a number indicating the total number of pieces in that particular lot. The first thing the operator has to do is to count the number of pieces in the lot and, then, by means of knob 78, set the type-wheel 40 to print that number. This will be done by turning knob 78 until the number representing the number of pieces in the lot is visible through the sight opening 92. The machine is then ready to proceed with the operation of printing and forming the tags. The operator presses down on the upper end of the lever 34 to the limit of movement of said lever, and then releases it. In the first part of the forward stroke, the inking pad 97 is moved against the type at printing position to ink these type, and then withdrawn. Then, the rocking of the main operating shaft 33 becomes effective to straighten out the toggle linkages, and to rock arms 35 to carry the type toward the tape on platen 24. As the type-head moves toward the platen, the inking frame, carrying the ink reservoir 96 and inking pad 97, will be revolved counterclockwise, so as to move it out of the way. During the forward stroke of the machine and the downward movement of arms 35, the pawl-carrying arm 121 will be rocked counterclockwise (Fig. 13) so as to engage the tooth 128 of pawl 126 with a fresh tooth on ratchet wheel 125. Finally, the type engage the tape supported on the platen 24 and make the desired imprint thereon. During the downward movement of the type-carrying head, the portion 148 of the inking frame has engaged the upper surface 143 of blade-operating lug 141, and the blade has been rocked into a position below the top surface of the platen, where it is engaged and held by the hook 151 of latch 149. The parts are then in the position shown in Fig. 14. During the return stroke, when springs 53 are returning lever 34 to its normal position, the type-carrying head and arms 35 rock clockwise (Fig. 3) to carry the type away from the platen and, during this return movement, the inking frame, the ink reservoir and the inking pad are returned to the position shown in Fig. 13. During the upward movement of the arms 35, the pawl-carrying arm 121 is rocked clockwise (Fig. 14), thus feeding the tape past the cutting edge 134, so that the portion of tape, on which the imprint has been made, extends beyond said cutting edge. At the very close of the upward movement of arms 35, stud 160 engages shoulder 159 of the release member 156, and the tail 157 of that member cams the latch 149 to release position, so that the blade 140 is released and forced upwardly by its spring 144, shearing the projecting portion of the tape to form a tag. The operator repeats this operation as many times as there are tags required for the lot. When he has completed the lot of tags, and is ready to make tags for a new batch of garments, he must, first, set the consecutive number device to print the next consecutive number. He does this by pressing down on the key tip 70, which rocks the yoke 57 counterclockwise (Fig. 3) against the tension of spring 66. This advances the consecutive number type-wheels to print the next consecutive number, and, at the same time, the cam 86 on yoke 57 depresses pin 87 and moves plunger 81 longitudinally of shaft 37, thereby disengaging the ratchet teeth 77 and 74 and permitting spring 88 to return the piece number type-wheel 40 to its normal, non-printing position. The operator, then, resets it to print the number of pieces in the next lot and is ready to print and form tags for that lot.

We are aware that the tag forming and printing mechanism herein disclosed is susceptible of considerable variation, without departing from the spirit of our invention, and, therefore, we claim our invention broadly, as indicated by the appended claims.

Having thus described our invention, what we claim as new and useful, and desire to secure by Letters Patent, is:

1. In a printing mechanism, the combination of a shaft; a sleeve slidably and rotatably mounted on said shaft; a type-wheel non-rotatably secured to said sleeve; manual means for rotating said sleeve on said shaft to set the type-wheel to print a desired number; yieldable means for holding said sleeve in set position with respect to said shaft; means for releasing said holding means; and means for automaticaly restoring said sleeve to home position upon automatic release of said holding means.

2. In a printing mechanism, the combination of a shaft; a sleeve slidably and rotatably mounted on said shaft; a type-wheel non-rotatably secured to said sleeve; manual means for rotating said sleeve on said shaft to set the type-wheel to print a desired number; yieldable means for holding said sleeve in set position with respect to said shaft; a member rockable on said shaft from and to normal position; means, actuated by the rocking of said member from normal position, for releasing said holding means; and means for automatically restoring said sleeve to home position upon automatic release of said holding means.

3. In a printing mechanism, the combination of a shaft; a sleeve slidably and rotatably mounted on said shaft; a type-wheel non-rotatably secured to said sleeve; interengaging ratchet means on said sleeve and shaft; spring means acting on said sleeve to hold said ratchet means in engagement; manual means for rotating said sleeve on said shaft to set the type-wheel to print a desired number; means for moving said sleeve longitudinally against the pressure of said spring means to disengage said ratchet means; and means for automatically restoring said sleeve to home position upon disengagement of said ratchet means.

4. In a printing mechanism, the combination of a shaft; a sleeve slidably and rotatably mounted on said shaft; a type-wheel non-rotatably secured to said sleeve; interengaging ratchet means on said sleeve and shaft; spring means acting on said sleeve to hold said ratchet means in engagement; manual means for rotating said sleeve on said shaft to set the type-wheel to print a desired number; a member rockable on said shaft from and to normal position; means, actuated by the rocking of said member from normal position, for moving said sleeve longitudinally against the pressure of said spring means to disengage said ratchet means; and means for automatically restoring said sleeve to home position upon disengagement of said ratchet means.

5. In a printing mechanism, the combination of a shaft; a sleeve slidably and rotatably mounted on said shaft; a type-wheel non-rotatably secured to said sleeve, interengaging ratchet means on said sleeve and shaft; spring means acting on said sleeve to hold said ratchet means in engagement; manual means for rotating said sleeve on said shaft to set the type-wheel to print a desired number; a member rockable on said shaft from and to normal position; a cam carried by said member; means, actuated by said cam, for moving said sleeve longitudinally against the pressure of said spring means to disengage said ratchet means when said member is rocked from normal position; and means for automatically restoring said sleeve to home position upon disengagement of said ratchet means.

6. In a printing mechanism, the combination of a shaft; a sleeve slidably and rotatably mounted on said shaft; a type-wheel non-rotatably secured to said sleeve; interengaging ratchet means on said sleeve and shaft; a plunger secured to said sleeve and slidable in said shaft; spring means acting on said plunger and tending to hold said ratchet means in engagement; manual means for rotating said sleeve on said shaft to set the type-wheel to print a desired number; a member rockable on said shaft from and to normal position; a cam carried by said member; means, actuated by said cam when the member rocks from normal position, for moving said plunger longitudinally of the shaft against the pressure of said spring means to disengage said ratchet means; and means for automatically restoring said sleeve to home position upon disengagement of said ratchet means.

7. In a printing mechanism, the combination of a shaft having an axially located chamber in one end thereof, and a plurality of ratchet teeth formed thereon surrounding the open end of said chamber; a sleeve slidably and rotatably mounted on said end of the shaft and having a tooth engageable with said ratchet teeth; a type-wheel non-rotatably mounted on said sleeve; a plunger slidably mounted in said chamber and secured to said sleeve; a spring acting on said plunger and tending to move said plunger and sleeve in a direction to maintain the tooth on the sleeve in engagement with said ratchet means; manual means for rotating said sleeve on said shaft to set the type-wheel to print a desired number and to cause said tooth to ratchet over said ratchet teeth; means for moving said plunger and sleeve longitudinally against the pressure of said spring to disengage said tooth from said ratchet teeth; and means for automatically restoring said sleeve and type-wheel to home position upon such disengagement.

8. In a printing mechanism, the combination of a shaft having an axially located chamber in one end thereof and a plurality of ratchet teeth formed thereon surrounding the open end of said chamber; a sleeve slidably and rotatably mounted on said end of the shaft and having a tooth engageable with said ratchet teeth; a type-wheel non-rotatably mounted on said sleeve; a plunger slidably mounted in said chamber and secured to said sleeve; a spring acting on said plunger and tending to move said plunger and sleeve in a direction to maintain the tooth on the sleeve in engagement with said ratchet teeth; manual means for rotating said sleeve on said shaft to set the type-wheel to print a desired number and to cause said tooth to ratchet over said ratchet teeth; a member rockable on said shaft from and to a normal position; means, actuated by the rocking of said member from normal position, for moving said plunger and sleeve longitudinally against the pressure of said spring to disengage said tooth from said ratchet teeth; and means for automatically restoring said sleeve and type-wheel to home position upon such disengagement.

9. In a printing mechanism, the combination of a shaft having an axially located chamber in one end thereof and a plurality of ratchet teeth formed thereon surrounding the open end of said chamber; a sleeve slidably and rotatably mounted on said end of the shaft and having a tooth engageable with said ratchet teeth; a type-wheel non-rotatably mounted on said sleeve; a plunger slidably mounted in said chamber and secured to said sleeve; a spring acting on said plunger and tending to move said plunger and sleeve in a direction to maintain the tooth on the sleeve in engagement with said ratchet teeth; manual means for rotating said sleeve on said shaft to set the type-wheel to print a desired number and to cause said tooth to ratchet over said ratchet teeth; a member rockable on said shaft from and to a normal position; a cam carried by said member; means, actuated by said cam as said member rocks from normal position, for moving said plunger and sleeve longitudinally against the pressure of said spring to disengage said tooth from said ratchet teeth; and means for automatically restoring said sleeve and type-wheel to home position upon such disengagement.

10. In a printing mechanism, the combination of a shaft having an axially located chamber in one end thereof and a plurality of ratchet teeth formed thereon surrounding the open end of said chamber; a sleeve slidably and rotatably mounted on said end of the shaft and having a tooth engageable with said ratchet teeth; a type-wheel non-rotatably mounted on said sleeve; a plunger slidably mounted in said chamber and secured to said sleeve, said plunger having a pointed inner end remote from said end of the shaft; a spring acting on said plunger and tending to move said plunger and sleeve in a direction to maintain the tooth on the sleeve in engagement with said ratchet teeth; manual means for rotating said sleeve on said shaft to set the type-wheel to print a desired number and to cause said tooth to ratchet over said ratchet teeth; a member rockable on said shaft from and to a normal position; a cam carried by said member; a pin slidably mounted in said shaft, transversely of the axis thereof, and disposed with one end in position to be engaged by said cam and the other end in position to engage the pointed end of said plunger, whereby the rocking of said member from normal position actuates said pin to move the plunger and sleeve longitudinally against the pressure of said spring to disengage said tooth from said ratchet teeth; and means for automatically restoring said sleeve and type-wheel to home position upon such disengagement.

11. In a printing mechanism, the combination of a shaft having an axially located chamber in one end thereof and a plurality of ratchet teeth formed thereon surrounding the open end of said chamber; a sleeve slidably and rotatably mounted on said end of the shaft and having a tooth engageable with said ratchet teeth; a type-wheel non-rotatably mounted on said sleeve; a helical spring surrounding said shaft and having one end anchored and the other end fixed to said type-wheel; a plunger slidably mounted in said chamber and secured to said sleeve; a spring acting on said plunger and tending to move said plunger and sleeve in a direction to maintain the tooth on the sleeve in engagement with said ratchet teeth; manual means for rotating said sleeve on said shaft to set the type-wheel to print a desired number and to cause said tooth to ratchet over said ratchet teeth; and means for moving said plunger and sleeve longitudinally against the pressure of said last-mentioned spring to disengage said tooth from said ratchet teeth.

12. In a printing mechanism having means for printing consecutive numbers and a number denoting the number of pieces in a lot, the combination of a shaft; a plurality of consecutive number type-wheels journaled thereon; means for setting said type-wheels to print the next consecutive number; a piece number type-wheel journaled on said shaft; manual means for rotating said piece number type-wheel from home position to position to print a desired number; yieldable means for holding said piece number type-wheel in set position with respect to said shaft; means, actuated by operation of said consecutive number setting means, for releasing said holding means; and means for automatically restoring said piece number type-wheel to home position upon release of said holding means.

13. In a printing mechanism having means for printing consecutive numbers and a number denoting the number of pieces in a lot, the combination of a shaft; a plurality of consecutive number type-wheels journaled thereon; means for setting said type-wheels to print the next consecutive number, including a frame rockable on said shaft from and to a normal position; a piece number type-wheel journaled on said shaft; manual means for rotating said piece number type-wheel from home position to position to print a desired number; yieldable means for holding said piece number type-wheel in set position with respect to said shaft; means, actuated by the rocking of said member from normal position to set the consecutive number type-wheels to print the next consecutive number, for releasing said holding means; and means for automatically restoring said piece number type-wheel to home position upon release of said holding means.

14. In a printing mechanism having means for printing consecutive numbers and a number indicating the number of pieces in a lot, the combination of a shaft; a plurality of consecutive number type-wheels journaled thereon; means for setting said type-wheels to print the next consecutive number; a sleeve slidably and rotatably mounted on said shaft; a piece number type-wheel non-rotatably mounted on said sleeve; manual means for rotating said sleeve on said shaft to set the piece number type-wheel to print a desired number; yieldable means for holding said sleeve in set position with respect to said shaft; means, actuated by operation of said consecutive number setting means, for releasing said holding means; and means for automatically restoring said sleeve to home position upon release of said holding means.

15. In a printing mechanism having means for printing consecutive numbers and a number indicating the number of pieces in a lot, the combination of a shaft; a plurality of consecutive number type-wheels journaled thereon; means for setting said consecutive number type-wheels to print the next consecutive number, including a frame rockable on said shaft from and to a normal position; a sleeve slidably and rotatably mounted on said shaft; a piece number type-wheel non-rotatably mounted on said sleeve; manual means for rotating said sleeve on said shaft to set the piece number type-wheel to print a desired number; yieldable means for holding said sleeve in set position with respect to said shaft; means, actuated by the rocking of said frame from normal position to set the consecutive number type-wheels to print the next consecutive number, for releasing said holding means; and means for automatically restoring said sleeve to home position upon release of said holding means.

16. In a printing mechanism having means for printing consecutive numbers and a number indicating the number of pieces in a lot, the combination of a shaft; a plurality of consecutive number type-wheels journaled thereon; means for setting said type-wheels to print the next consecutive number; a sleeve slidably and rotatably mounted on said shaft; a piece number type-wheel non-rotatably mounted on said sleeve; interengaging ratchet means on said sleeve and shaft; spring means acting on said sleeve to hold said ratchet means in engagement; manual means for rotating said sleeve on said shaft to set the piece number type-wheel to print a desired number; means, actuated by the operation of said consecutive number setting means, for moving said sleeve longitudinally against the pressure of said spring means to disengage said ratchet means; and means for automatically restoring said sleeve to home position upon disengagement of said ratchet means.

17. In a printing mechanism having means for printing consecutive numbers and a number indicating the number of pieces in a lot, the combination of a shaft; a plurality of consecutive number type-wheels journaled thereon; means for setting said consecutive number type-wheels to print the next consecutive number, including a frame rockable on said shaft from and to a normal position; a sleeve slidably and rotatably mounted on said shaft; a piece number type-wheel non-rotatably mounted on said sleeve; interengaging ratchet means on said sleeve and shaft; spring means acting on said sleeve to hold said ratchet means in engagement; manual means for rotating said sleeve on said shaft to set the piece number type-wheel to print a desired number; means, actuated by the rocking of said member from normal position to set the consecutive number type-wheel to print the next consecutive number, for moving said sleeve longitudinally against the pressure of said spring means to disengage said ratchet means; and means for automatically restoring said sleeve to home position upon disengagement of said ratchet means.

18. In a printing mechanism having means for printing consecutive numbers and a number indicating the number of pieces in a lot, the combination of a shaft; a plurality of consecutive number type-wheels journaled thereon; means for setting said type-wheels to print the next consecutive number, including a frame rockable on said shaft from and to normal position; a cam carried by said frame; a sleeve slidably and rotatably mounted on said shaft; a piece number type-wheel non-rotatably mounted on said sleeve; interengaging ratchet means on said sleeve and shaft; spring means acting on said sleeve to hold said ratchet means in engagement; manual means for rotating said sleeve on said shaft to set the piece number type-wheel to print a desired number; means, actuated by said cam as said frame rocks from normal position, for moving said sleeve longitudinally against the pressure of said spring means to disengage said ratchet means; and means for automatically restoring said sleeve to home position upon disengagement of said ratchet means.

19. In a printing mechanism having means for printing consecutive numbers and a number indicating the number of pieces in a lot, the combination of a shaft having an axially located chamber in one end thereof and a plurality of ratchet teeth formed thereon surrounding the open end of said chamber; a plurality of consecutive number type-wheels journaled on said shaft; means for setting said type-wheels to print the next consecutive number; a sleeve slidably and rotatably mounted on said end of the shaft and having a tooth engageable with said ratchet teeth; a piece number type-wheel non-rotatably mounted on said sleeve; a plunger slidably mounted in said chamber and secured to said sleeve; a spring acting on said plunger and tending to move said plunger and sleeve in a direction to maintain the tooth on the sleeve in engagement with said ratchet teeth; manual means for rotating said sleeve on said shaft to set the piece number type-wheel to print a desired number and to cause said tooth to ratchet over said ratchet teeth; means, actuated by the operation of said consecutive number setting means, for moving said plunger and sleeve longitudinally against the pressure of said spring to disengage said tooth from said ratchet teeth; and means for automatically restoring said sleeve and piece number typewheel to home position upon such disengagement.

20. In a printing mechanism having means for printing consecutive numbers and a number indicating the number of pieces in a lot, the combination of a shaft having an axially located chamber in one end thereof and a plurality of ratchet teeth formed thereon surrounding the open end of said chamber; a plurality of consecutive number type-wheels journaled on said shaft; means for setting said type-wheels to print the next consecutive number, including a frame rockable on said shaft from and to a normal position; a sleeve slidably and rotatably mounted on said end of the shaft and having a tooth engageable with said ratchet teeth; a piece number type-wheel non-rotatably mounted on said sleeve; a plunger slidably mounted in said chamber and secured to said sleeve; a spring acting on said plunger and tending to move said plunger and sleeve in a direction to maintain the tooth on the sleeve in engagement with said ratchet teeth; manual means for rotating said sleeve on said shaft to set the piece number type-wheel to print a desired number and to cause said tooth to ratchet over said ratchet teeth; means, actuated by the rocking of said frame from normal position to set the consecutive number type-wheel to print the next consecutive number, for moving said plunger and sleeve longitudinally against the pressure of said spring to disengage said tooth from said ratchet teeth; and means for automatically restoring said sleeve and piece number type-wheel to home position upon such disengagement.

21. In a printing mechanism having means for printing consecutive numbers and a number indicating the number of pieces in a lot, the combination of a shaft having an axially located chamber in one end thereof and a plurality of ratchet teeth formed thereon surrounding the open end of said chamber; a plurality of consecutive number type-wheels journaled on said shaft; means for setting said type-wheels to print the next consecutive number, including a frame rockable on said shaft from and to a normal position; a cam carried by said frame; a sleeve slidably and rotatably mounted on said end of the shaft and having a tooth engageable with said ratchet teeth; a piece number type-wheel non-rotatably mounted on said sleeve; a plunger slidably mounted in said chamber and secured to said sleeve; a spring acting on said plunger and tending to move said plunger and sleeve in a direction to maintain the tooth on the sleeve in engagement with said ratchet teeth; manual means for rotating said sleeve on said shaft to set the piece number type-wheel to print a desired number and to cause said tooth to ratchet over said ratchet teeth; means, actuated by said cam when said frame rocks from normal position, for moving said plunger and sleeve longitudinally against the pressure of said spring to disengage said tooth from said ratchet teeth; and means for automatically restoring said sleeve and said piece number type-wheel to home position upon such disengagement.

22. In a printing mechanism having means for printing consecutive numbers and a number indicating the number of pieces in a lot, the combination of a shaft having an axially located chamber in one end thereof and a plurality of ratchet teeth formed thereon surrounding the open end of said chamber; a plurality of consecutive number type-wheels journaled on said shaft; means for setting said type-wheels to print the next consecutive number, including a frame rockable on said shaft from and to a normal position; a cam carried by said frame; a sleeve slidably and rotatably mounted on said end of the shaft and having a tooth engageable with said ratchet teeth; a piece number type-wheel non-rotatably mounted on said sleeve; a plunger slidably mounted in said chamber and secured to said sleeve, said plunger having a pointed end remote from the end of said shaft; a spring acting on said plunger and tending to move said plunger and sleeve in a direction to maintain the tooth on the sleeve in engagement with said ratchet teeth; manual means for rotating said sleeve on said shaft to set the piece number type-wheel to print a desired number and to cause said tooth to ratchet over said ratchet teeth; a pin slidably mounted in said shaft, transversely of the axis thereof, and having one end engageable by said cam and the other end engaging the pointed end of said plunger, whereby the rocking of said frame from normal position moves said plunger and sleeve longitudinally against the pressure of said spring to disengage said tooth from said ratchet teeth; and means for automatically restoring said sleeve and piece number type-wheel to home position upon such disengagement.

23. In a printing mechanism having means for printing consecutive numbers and a number indicating the number of pieces in a lot, the combination of a shaft; a plurality of consecutive number type-wheels journaled thereon; means for setting said type-wheels to print the next consecutive number; a piece number type-wheel journaled on said shaft; a helical spring surrounding said shaft and having one end anchored and the other end secured to said piece number type-wheel; manual means for rotating such piece number type-wheel from home position to position to print a desired number; yieldable means for holding such piece number type-wheel in set position with respect to said shaft; and means, actuated by operation of said consecutive number setting means, for releasing said holding means.

THOMAS A. CAROTHERS.
CARL H. BURKHARD.

(References on following page)

REFERENCES CITED

The following references are of record in the file of this patent:

UNITED STATES PATENTS

| Number | Name | Date |
|---|---|---|
| 248,717 | Davis | Oct. 25, 1881 |
| 447,457 | Beardsley et al. | Mar. 3, 1891 |
| 478,241 | Shaw | July 5, 1892 |
| 526,885 | Wolfe | Oct. 2, 1894 |
| 707,751 | Alexander | Aug. 26, 1902 |
| 1,125,428 | Lang | Jan. 19, 1915 |
| 1,167,733 | Akerly | Jan. 11, 1916 |
| 1,366,620 | Wolfe | Jan. 25, 1921 |
| 1,484,136 | Kohnle | Feb. 19, 1924 |
| 1,518,415 | Speidel et al. | Dec. 9, 1924 |
| 1,574,294 | Kohnle | Feb. 23, 1926 |
| 1,648,276 | Kern | Nov. 8, 1927 |
| 1,667,810 | Kohnle | May 1, 1928 |
| 1,672,072 | Chamberlin | June 5, 1928 |
| 1,687,635 | Putnam | Oct. 16, 1928 |
| 1,746,516 | Boyer | Feb. 11, 1930 |
| 1,856,171 | Scher | May 3, 1932 |
| 1,968,669 | Arnold | July 31, 1934 |
| 1,991,423 | Shaver | Feb. 19, 1935 |
| 2,027,637 | Eaton | Jan. 14, 1936 |
| 2,087,315 | Bugg | July 20, 1937 |
| 2,108,400 | Barker-Bland | Feb. 15, 1938 |
| 2,111,556 | Crosby | Mar. 22, 1938 |
| 2,118,871 | Thompson | May 31, 1938 |
| 2,121,864 | Flood | June 28, 1938 |
| 2,125,626 | Flood | Aug. 2, 1938 |
| 2,165,439 | Arnold | July 11, 1939 |
| 2,310,179 | Kohnle | Feb. 2, 1943 |
| 2,370,152 | Faust | Feb. 27, 1945 |